(12) United States Patent
Akiyama et al.

(10) Patent No.: US 7,321,736 B2
(45) Date of Patent: Jan. 22, 2008

(54) OPTICAL RECEIVING STATION, OPTICAL COMMUNICATION SYSTEM, AND DISPERSION CONTROLLING METHOD

(75) Inventors: Yuichi Akiyama, Kawasaki (JP); Hiroki Ooi, Kawasaki (JP); George Ishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/300,316

(22) Filed: Dec. 15, 2005

(65) Prior Publication Data

US 2006/0115278 A1    Jun. 1, 2006

Related U.S. Application Data

(62) Division of application No. 09/790,695, filed on Feb. 23, 2001, now Pat. No. 7,006,770.

(30) Foreign Application Priority Data

May 29, 2000 (JP) .............................. 2000-158708

(51) Int. Cl.
*H04B 10/06* (2006.01)
*H04B 10/18* (2006.01)

(52) U.S. Cl. ...................... 398/212; 398/213; 398/201

(58) Field of Classification Search ................. 398/81, 398/159, 147–148, 208–209, 95, 213
See application file for complete search history.

(56) References Cited

U.S. PATENT DOCUMENTS 6,580,542 B1    6/2003 Song et al. ................. 398/147
7,006,770 B2 *  2/2006 Akiyama et al. ........... 398/159

FOREIGN PATENT DOCUMENTS

| EP | 0 902 558 | 3/1999 |
|---|---|---|
| EP | 0 902 560 | 3/1999 |
| JP | 11-346191 | 12/1999 |

OTHER PUBLICATIONS

Patent Abstracts of Japan of JP 11-068657 dated Mar. 9, 1999.
Patent Abstracts of Japan of JP 8-139681 dated May 31, 1996.
Patent Abstracts of Japan of JP 10-112688 dated Apr. 28, 1998.
Patent Abstracts of Japan of JP 10-164010 dated Jun. 19, 1998.

(Continued)

*Primary Examiner*—Leslie Pascal
(74) *Attorney, Agent, or Firm*—Staas & Halsey LLP

(57) ABSTRACT

The invention relates to an optical receiving station, an optical communication system, and a dispersion controlling method for precisely controlling chromatic dispersion in an optical transmission line or chromatic dispersion in an optical transmission line that varies with time. An optical receiving station is provided with a dispersion compensating section for receiving, via an optical transmission line, an optical signal modulated according to an optical duo-binary modulation method and for changing a dispersion value to be used for compensating for chromatic dispersion in an optical transmission line, an intensity detecting section for detecting the intensity of a specific frequency component of the optical signal output from the dispersion compensating section, and a controlling section for adjusting the dispersion value of the dispersion compensating section so that the output of the intensity detecting section has a predetermined extreme value.

6 Claims, 15 Drawing Sheets

OTHER PUBLICATIONS

Patent Abstracts of Japan of JP 9-236781 dated Sep. 9, 1997.
M. Yoneyama et al., "A 10-Gbit/s optical duobinary precoder IC using 0.2-μm gate-length GaAs MESFETs" dated 1998.
Takashi Ono, "Demonstration of high-dispersion tolerance of 20-Gbit/s optical duobinary signal generated by a low-pass filtering method", OFC '97 Technical Digest, 1997, pp. 268-269.

* cited by examiner

Fig.1
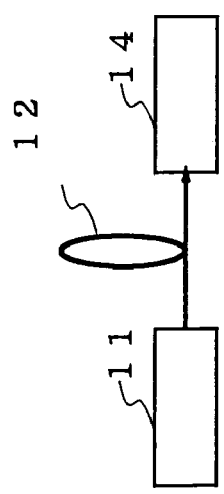
(a)
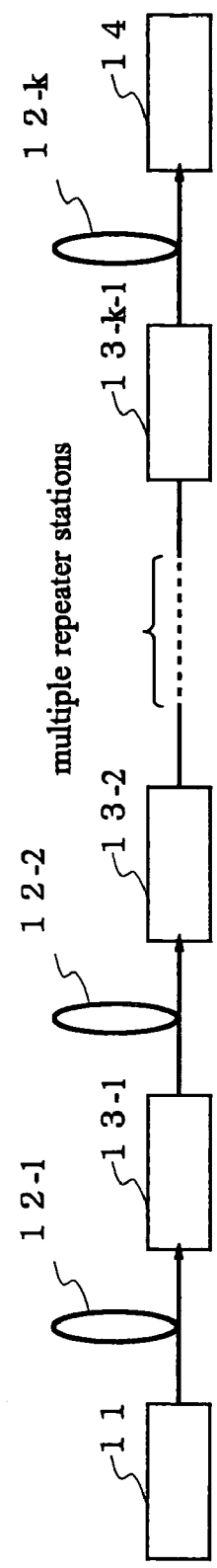
(b)

Fig.5
(a)
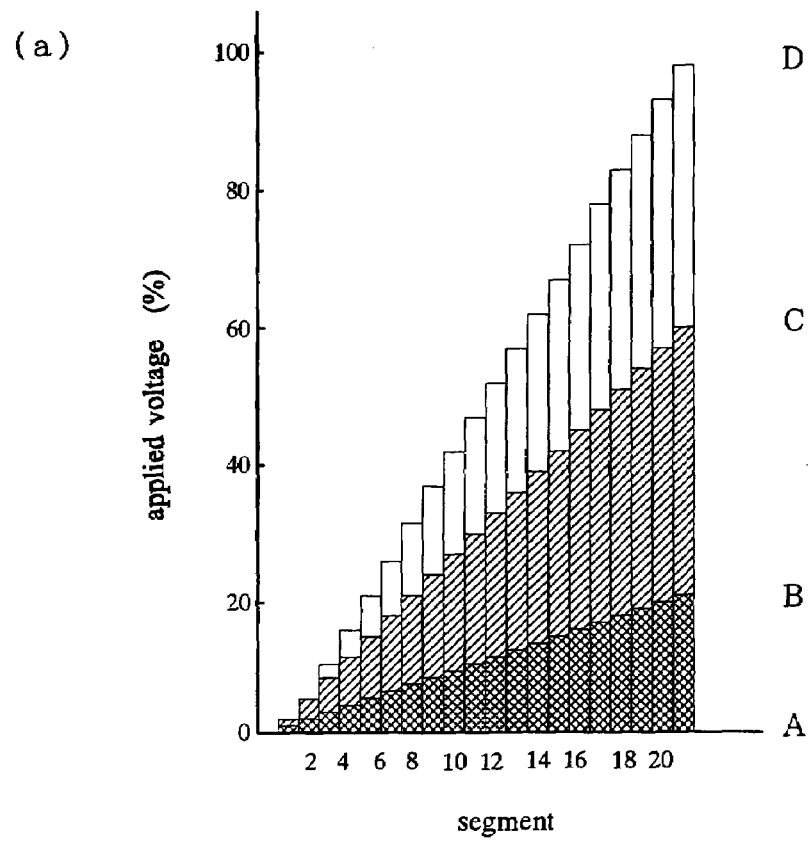
(b)
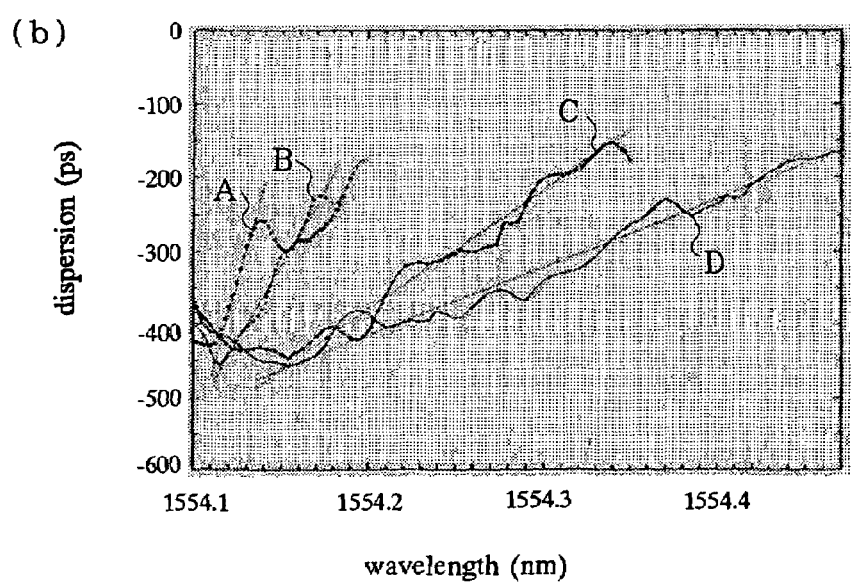

Fig.8
(a) Pin = 0 dBm
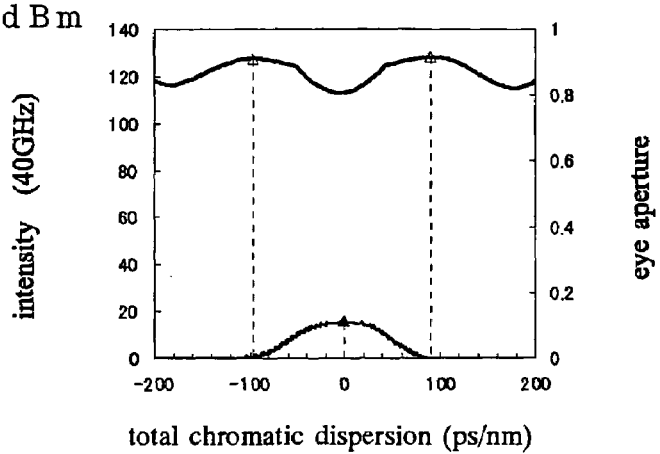
(b) Pin = +3 dBm
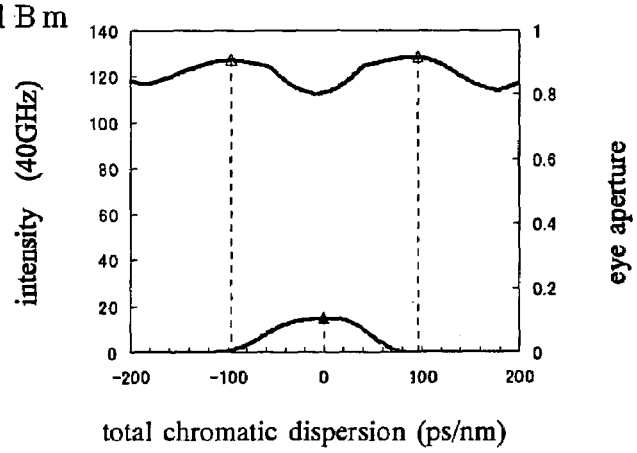
(c) Pin = +6 dBm
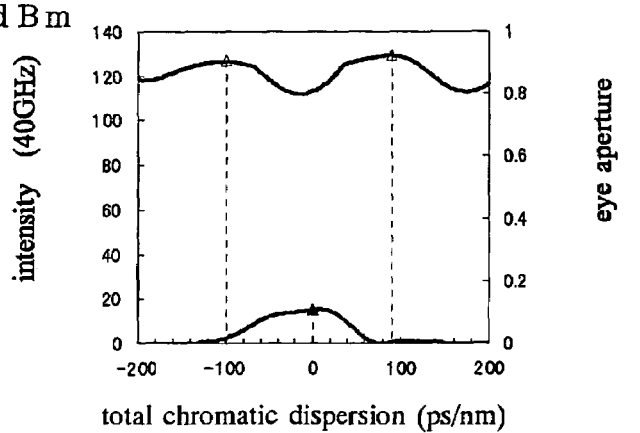

Fig.9
(a) Pin=+9dBm
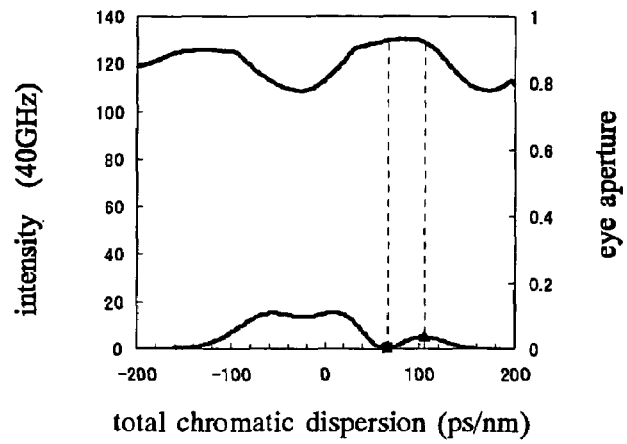
(b) Pin=+12dBm
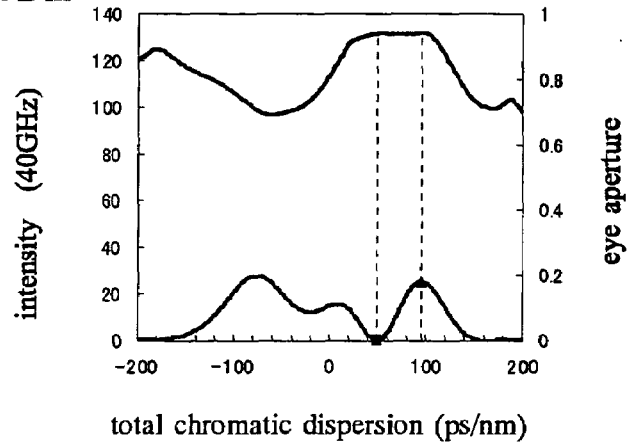
(c) Pin=+15dBm
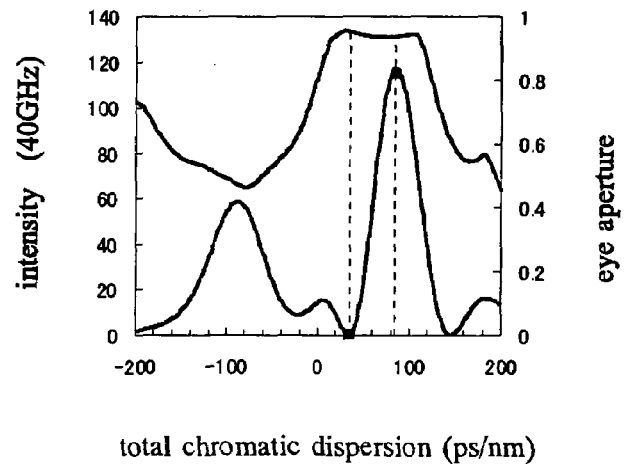

Fig.14
(a) $P_{in} = 0 \, dBm$
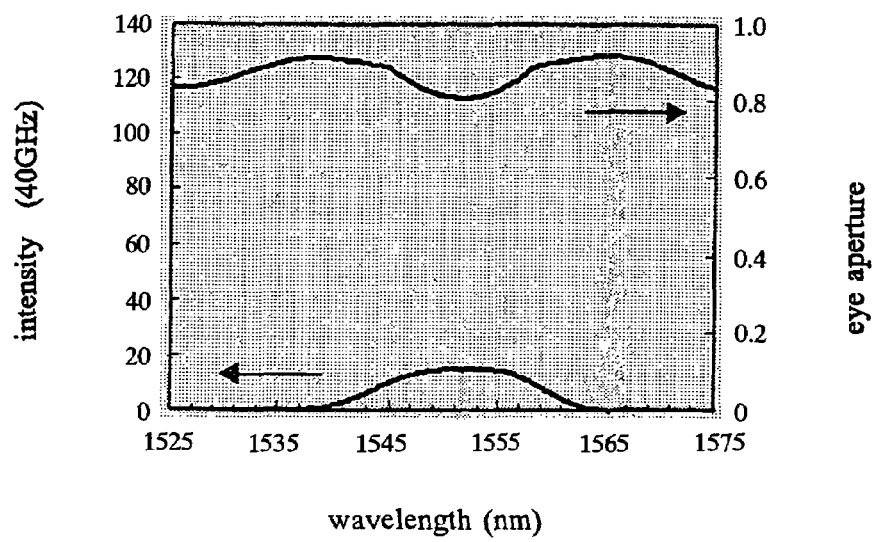
(b) $P_{in} = +9 \, dBm$
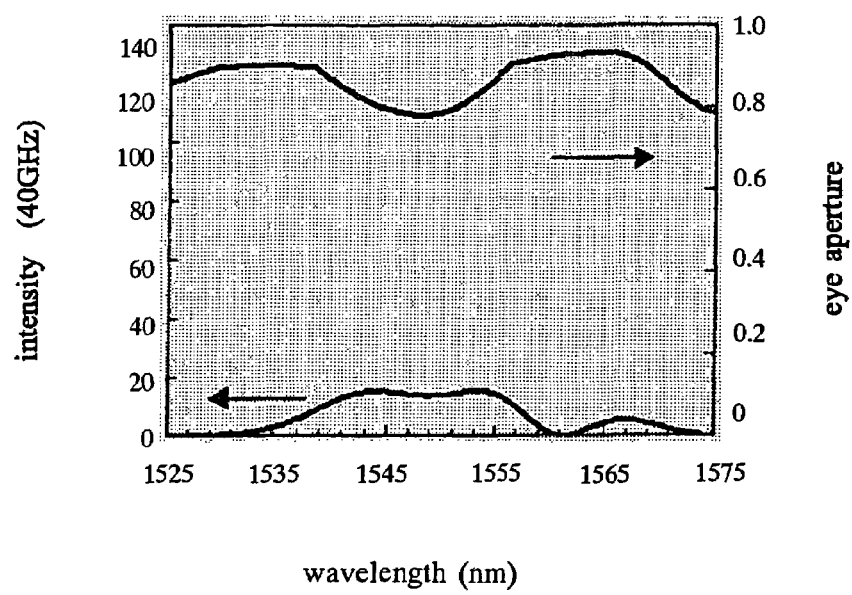

OPTICAL RECEIVING STATION, OPTICAL COMMUNICATION SYSTEM, AND DISPERSION CONTROLLING METHOD

This application is a divisional of application Ser. No. 09/790,695, filed Feb. 23, 2001, which is incorporated herein by reference now U.S. Pat. No. 7,006,770.

BACKGROUND OF THE INVENTION

1. Field of the Invention

The present invention relates to an optical receiving station and an optical communication system for compensating for chromatic dispersion in an optical transmission line in an optical transmission system where an optical duo-binary modulation method is used. The invention also relates to a dispersion compensating method for adjusting the total dispersion amount of an optical transmission line.

At present, optical communication apparatuses capable of transmitting a large amount of optical signals over an ultra-long distance are required for construction of future multimedia networks. Optical transmission systems of 10 Gb/s have been put in practical use in current trunk line optical communication, to satisfy the above requirement. Further, time division multiplexing optical transmission systems of 40 Gb/s have been studied and developed.

2. Description of the Related Art

The maximum transmission distance of an optical fiber without relaying is limited by attenuation and chromatic dispersion of an optical signal. To increase the transmission distance, it is necessary to compensate for the attenuation and chromatic dispersion. The attenuation is compensated by a rare-earth-element-doped fiber amplifier or the like. On the other hand, the chromatic dispersion is compensated by inserting, in an optical transmission line, a dispersion compensator having a fixed dispersion characteristic of an opposite sign to the sign of the value of dispersion received by an optical signal traveling through an optical fiber.

Incidentally, being in inverse proportion to the square of the bit rate of an optical signal, the dispersion compensation tolerance at 40 Gb/s is as small as $\frac{1}{16}$ of that at 10 Gb/s. This makes it necessary to precisely adjust the dispersion value of a dispersion compensator.

The dispersion compensation tolerance signifies the width of an allowable dispersion compensation value range for satisfaction of a certain transmission condition when compensating for chromatic dispersion by a dispersion compensator. For example, it is an allowable dispersion compensation value range for suppressing the power penalty (i.e., deterioration in the receiver sensitivity of an optical signal due to transmission) to 1 dB or less.

The chromatic dispersion of an optical transmission line varies with time due to a temperature variation, for example. The variation amount of dispersion of an optical transmission line is given by (temperature dependence of the zero dispersion wavelength of the optical transmission line)×(temperature variation)×(dispersion slope)×(transmission distance). For example, where the optical transmission line is a dispersion-shifted optical fiber, the temperature variation is $-40°$ C. to $+60°$ C., and the transmission distance is 600 km, $0.03$ nm/$°$ C.×$100°$ C.×$0.08$ ps/nm$^2$/km×600 km=144 ps/nm.

This value is not negligible even if an optical duo-binary modulation method with a wide dispersion compensation tolerance is employed to modulate an optical signal.

A simulation shows that with a possible transmission condition of the eye pattern penalty 1 dB or less, the dispersion compensation tolerance of an optical duo-binary modulation method of 40 Gb/s is 400 ps/nm, which is 22 km (400 ps/nm÷18.6 ps/nm/km) in terms of the length of an existing single-mode optical fiber.

SUMMARY OF THE INVENTION

An object of the present invention is therefore to provide an optical receiving station, an optical communication system, and a dispersion controlling method for precisely controlling chromatic dispersion in an optical transmission line for transmitting an optical signal in an optical transmission system where an optical duo-binary modulation method is used.

Another object of the invention is to provide an optical receiving station, an optical communication system, and a dispersion controlling method for precisely controlling chromatic dispersion in an optical transmission line that varies with time in an optical transmission system where an optical duo-binary modulation method is employed.

An optical duo-binary modulation method and modulator are disclosed in Japanese Unexamined Patent Application Publication No. Hei08-139681 and Japanese National Patent Publication No. Hei09-501296, for example.

The above objects are attained by the following sections.

According to a first section of the invention, an optical receiving station comprises a dispersion compensating section for receiving, via an optical transmission line, an optical signal modulated according to an optical duo-binary modulation method, and for changing a dispersion value to be used for compensating for chromatic dispersion in an optical transmission line; an intensity detecting section for detecting intensity of a specific frequency component of the optical signal output from the dispersion compensating section; and a controlling section for adjusting the dispersion value of the dispersion compensating section so that an output of the intensity detecting section has a predetermined extreme value.

According to a second section of the invention, an optical receiving station comprises a filter for receiving, via an optical transmission line, an optical signal modulated according to an optical duo-binary modulation method, and for changing a passing wavelength range to be used for compensating for chromatic dispersion in an optical transmission line; an intensity detecting section for detecting intensity of a specific frequency component of the optical signal output from the filter; and a wavelength controlling section for adjusting a wavelength of the optical signal so that an output of the intensity detecting section has a predetermined extreme value, and for adjusting the passing wavelength range of the filter to pass the adjusted wavelength.

According to a third section of the invention, in the optical receiving station according to the first or second section, a dispersion compensator for compensating for the chromatic dispersion in the optical transmission line with a fixed dispersion value is further provided and the optical signal is input to the intensity detecting section via the dispersion compensator.

According to a fourth section of the invention, an optical communication system comprises an optical sending station for generating an optical signal according to an optical duo-binary modulation method; an optical transmission line for transmitting the generated optical signal; and the optical receiving station according to one of the first to third sections for receiving the transmitted optical signal.

According to a fifth section of the invention, a dispersion controlling method for controlling chromatic dispersion in an optical transmission line for transmitting an optical signal modulated according to an optical duo-binary modulation method comprises the steps of detecting intensity of a specific frequency component of the optical signal; and adjusting a total dispersion amount of the optical transmission line so that the detected intensity has a predetermined extreme value.

For instance, the receiver sensitivity of an optical signal can be evaluated according to the eye aperture of an eye pattern. A certain relationship holds between the eye aperture characteristic with respect to a variance of the total chromatic dispersion of an optical transmission line and the intensity characteristic of a specific frequency component with respect to a variance of the chromatic dispersion.

Therefore, in the above optical receiving station, the optical communication system, and the dispersion compensating method, it is possible to precisely control the total chromatic dispersion since the total dispersion amount of an optical transmission line is controlled by a variable dispersion compensating section in accordance with the intensity of a detectable specific frequency component without directly detecting the total chromatic dispersion of the optical transmission line. The precise control of the total chromatic dispersion enables optimization of the receiver sensitivity and long distance transmission. Further, the above optical the receiving station, the optical communication system, and the dispersion compensating method can cope with variations with time because the dispersion value of the dispersion compensating section is variable.

The invention makes it possible to precisely compensate an optical signal modulated according to an optical duo-binary modulation method for chromatic dispersion in an optical transmission line. The invention also makes it possible to precisely compensate for chromatic dispersion in an optical transmission line that varies with time. Therefore, the transmission distance of can be increased in an optical communication system according to the invention. Further, the invention enables effective use of existing optical communication networks with 1.3-μm-band, single-mode optical fibers.

Other preferred sections for attaining the objects will be described in the following embodiments of the invention and the drawings.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIGS. 1A and 1B show the configurations of optical communication systems according to a first embodiment of the present invention;

FIGS. 5A and 5B are graphs showing voltage patterns to be applied to respective segments of the variable dispersion compensator and a dispersion characteristic for each voltage pattern, respectively;

FIGS. 8A–8C are graphs showing an intensity vs. total chromatic dispersion characteristics and an eye aperture vs. total chromatic dispersion characteristic in a linear range;

FIGS. 9A–9C are graphs showing an intensity vs. total chromatic dispersion characteristics and an eye aperture vs. total chromatic dispersion characteristic in a nonlinear range;

FIGS. 14A and 14B each show an intensity vs. wavelength characteristic and an eye aperture vs. wavelength characteristic.

DESCRIPTION OF THE PREFERRED EMBODIMENTS

Figure 2:
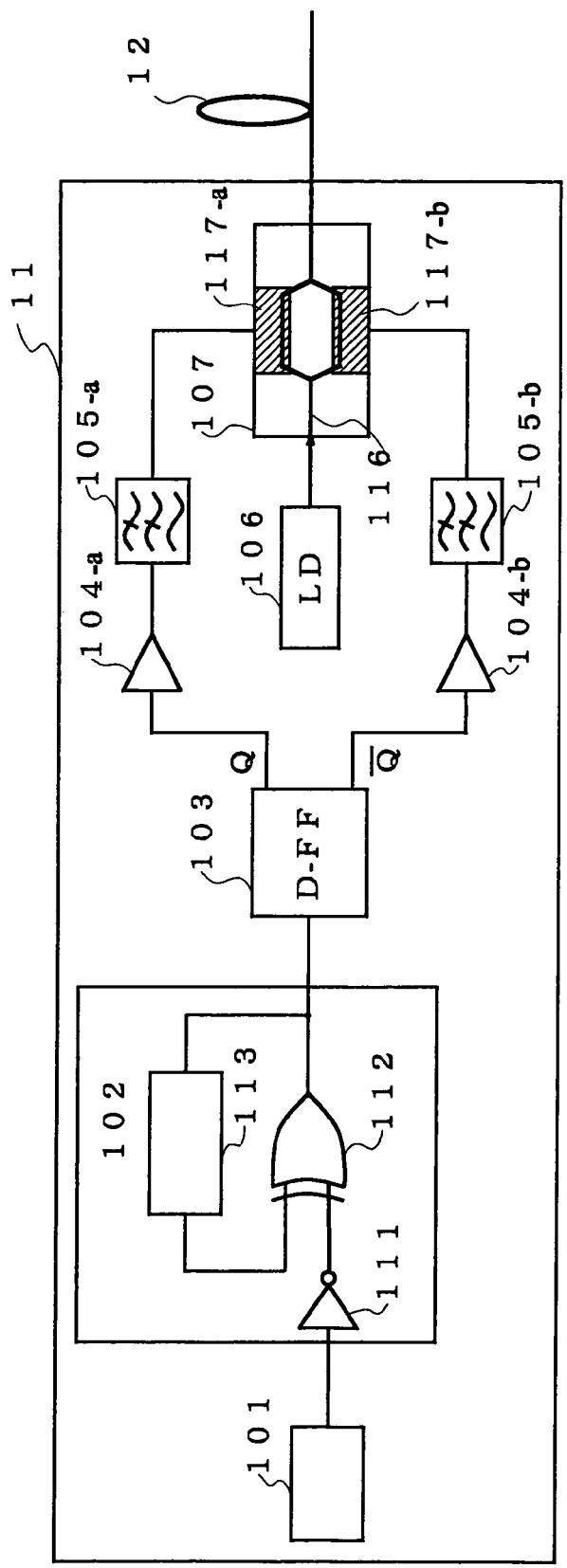
FIG. 2 shows the configuration of an optical sending station of the optical communication system according to the first embodiment.

Embodiments of the present invention will be hereinafter described with reference to the accompanying drawings. In the drawings, the same components are given the same reference symbols and descriptions therefor may be omitted.

First Embodiment (Configuration)

A first embodiment will be described with reference to FIGS. 1A and 1B to FIG. 10. The first embodiment is directed to an optical sending station, an optical communication system, and a dispersion controlling method according to the invention.

As shown in FIG. 1A, an optical communication system according to the first embodiment is composed of an optical sending station 11, an optical transmission line 12, and an optical receiving station 14.

An optical signal generated by the optical sending station 11 through modulation according to an optical duo-binary modulation method is sent to the optical transmission line 12, subjected to attenuation and chromatic dispersion in the optical transmission line 12, and then subjected to reception processing in the optical receiving station 14.

Where the transmission distance between the optical sending station 11 and the optical receiving station 14 is long, a necessary number of repeater stations 13 are provided in the optical transmission line 12 as shown in FIG. 1B. Having an optical amplifier etc., each repeater station 13 amplifies and relays an optical duo-binary signal. Examples of the optical amplifier are a semiconductor optical amplifier and a rare-earth-element-doped fiber amplifier.

Next, the configuration of the optical sending station 11 used in this optical communication system will be described with reference to FIG. 2.

The optical sending station 11 is composed of an NRZ generator 101, a precoder 102, a D flip-flop (hereinafter abbreviated as "D-FF") 103, amplifiers 104-*a* and 104-*b*, low-pass filters (hereinafter abbreviated as "LPF") 105-*a* and 105-*b*, a semiconductor laser (hereinafter abbreviated as "LD") 106, and a Mach-Zehnder interferometer type optical modulator (hereinafter abbreviated as "MZ modulator") 107.

The NRZ generator 101 generates a non-return-to-zero (hereinafter abbreviated as "NRZ") binary electrical signal that is in accordance with information to be transmitted from the optical sending station 11 to the optical receiving station 14.

The generated NRZ signal is input to an inverter 111 of the precoder 102. The precoder 102 is composed of the inverter 111, an exclusive-OR circuit (hereinafter abbreviated as "EXOR") 112, and a delay circuit 113.

The inverter 111 inverts an NRZ signal, that is, changes the truth value "0" to "1" and "1" to "0," and outputs the inverted NRZ signal to one port of the EXOR 112. For example, in the case of positive logic, the inverter 111 inverts a high voltage level to a low voltage level and a low voltage level to a high voltage level, and outputs a resulting signal to the one port of the EXOR 112.

An output of the EXOR 112 is input to the delay circuit 113 and the D-FF 103. The delay circuit 113 delays the input signal by 1 bit and outputs the delayed signal to the other port of the EXOR 112.

Therefore, EXOR 112 exclusive-ORs the outputs of the inverter 111 and the delay circuit 113 and outputs a resulting signal.

The D-FF 103 delays a received signal by a one-clock period and outputs a resulting signal. An output Q is amplified by the amplifier 104-*a* and then applied to one electrode 117-*a* of the MZ modulator 107 via the LPF 105-*a*. An inverted output $\overline{Q}$ is amplified by the amplifier 104-*b* and then applied to the other electrode 117-*b* of the MZ modulator 107 via the LPF 105-*b*.

The precoder 102, the D-FF 103, the amplifiers 104, and the LPFs 105 convert a binary NRZ signal into a ternary, duo-binary signal.

The MZ modulator 107 has electrodes 117 and an optical waveguide 116 that is formed by thermally diffusing titanium (Ti) in a lithium niobate (LiNbO$_3$) substrate. The optical waveguide 116 divides halfway into two branches, the electrodes 117 are placed on the respective branches of the optical waveguide 116, and the branches merge with each other on the output side.

The LD 106 emits laser light, or an optical carrier wave. The laser light is input to the MZ modulator 107, where it is modulated in light intensity according to a duo-binary signal applied to the electrodes 117 and thereby becomes an optical duo-binary signal, which is output to the optical transmission line 12.

Next, the configuration of the optical receiving station 14 that is used in this optical communication system will be described with reference to FIG. 3.

The optical receiving station 14 is composed of a dispersion compensating part 21, a coupler 122 for branching incident light into two parts, an optical receiving part 123, an intensity detecting part 22, and a controlling part 23. The dispersion compensating part 21 can receive an optical duo-binary signal and change a dispersion value to be used for compensating for chromatic dispersion. The intensity detecting part 22 detects the intensity of a specific frequency component of an optical duo-binary signal. The controlling part 23 adjusts the dispersion value of the dispersion compensating part 21 so that the output of the intensity detecting part 22 has a predetermined extreme value.

A more detailed description will be made below.

An optical duo-binary signal transmitted by the optical transmission line 12 is input to a variable dispersion compensator (hereinafter abbreviated as "VDC") 121 of the dispersion compensating part 21.

The VDC 121 compensates for chromatic dispersion of an optical duo-binary signal by using a dispersion value according to a control described below, and outputs a resulting signal to the optical receiving part 123 and the intensity detecting part 22 via the coupler 122.

The optical receiving part 123 receives and processes an optical duo-binary signal and extracts information that was sent from the optical sending station 11. For example, the optical receiving part 123 can demodulate an optical duo-binary signal into a binary electrical signal by detecting and photoelectrically converting the optical duo-binary signal, supplying a resulting ternary electrical signal to two discriminators for discriminating between 1s and 0s, and exclusive-ORing outputs of the respective discriminators.

On the other hand, the intensity detecting part 22 is composed of a photodiode (hereinafter abbreviated as "PD") 124, a band-pass filter (hereinafter abbreviated as "BPF") 125, an amplifier 126, and a power meter 127.

An optical duo-binary signal that is input to the intensity detecting part 22 is detected and photoelectrically converted by the PD 124. The BPF 125 extracts only a 40 GHz frequency component from a resulting electrical signal. An output of the BPF 125 is amplified to a predetermined level by the amplifier 126 and the power (intensity) of the amplified signal is detected by the power meter 127.

An output of the power meter 127 is input to a central processing unit (hereinafter abbreviated as "CPU") 128 of the controlling part 23. The controlling part 23 has the CPU 128 and a memory 129.

A table showing a relationship between voltage patterns and dispersion values of the VDC 121, programs for operation of the CPU 128, etc. are stored in advance in the memory 129. Various values etc. that occur during execution of a program are stored in the memory 129 on each occasion. The memory 129 refers to the relationship table etc. in response to a request from the CPU 128 and outputs a result to the CPU 128.

Being a microprocessor or the like, the CPU 128 outputs a signal to be used for controlling the dispersion value of the VDC 121 to a driving circuit 130 of the dispersion compensating part 21.

The dispersion compensating part 21 is composed of the VDC 121 and the driving circuit 130 for driving the VDC 121. The driving circuit 130 applies, to the VDC 121, voltages having a voltage pattern that is in accordance with a signal that is output from the CPU 128 and thereby changes the dispersion value of the VDC 121.

Next, one exemplary configuration of the dispersion compensating part 21 will be described.

The dispersion compensating part 21 is composed of the VDC 121 and the driving circuit 130.

Figure 4:
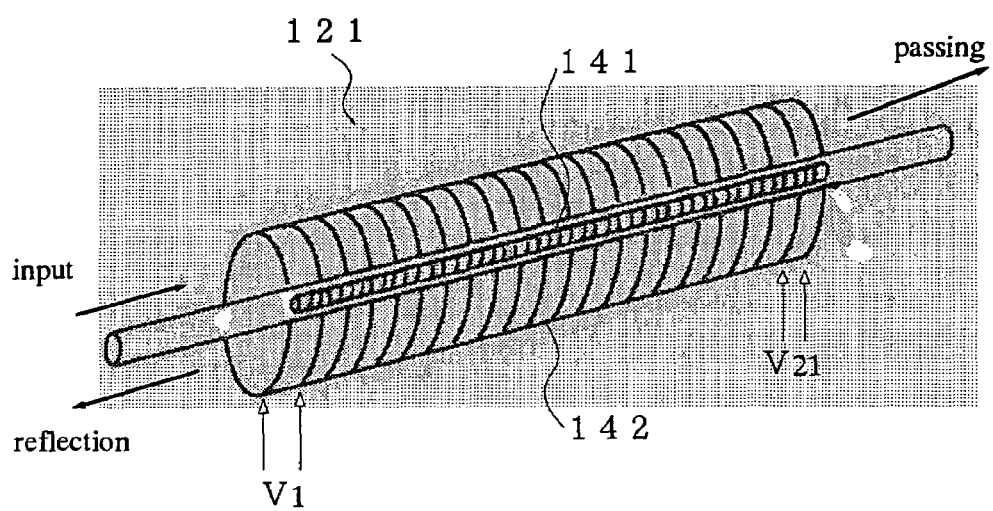
FIG. 4 shows one exemplary configuration of a variable dispersion compensator.

As shown in FIG. 4, the VDC 121 is configured in such a manner that piezoelectric elements 142 are attached to 21 respective segments of a chirped fiber Bragg grating 141. When voltages that are graded as shown in FIG. 5A are applied, as application voltages V1–V21 to be supplied to the respective piezoelectric elements 142, to the VDC 121, the pressure acting on the chirped fiber Bragg grating 141 in the longitudinal direction varies. The dispersion value (slope of a line) is varied as shown in FIG. 5B for voltage patterns A–D shown in FIG. 5A.

FIG. 4, FIGS. 5A and 5B, and the above related descriptions are excerpts from M.M. Ohm et al., "Tunable Fiber Grating Dispersion Using a Piezoelectric Stack," OFC '97 Technical Digest, WJ3, pp. 155–156.

Another, simplified version of the dispersion compensating part 21 is known that is composed of a plurality of dispersion compensation fibers having different dispersion compensation amounts, an optical switch, and a controlling CPU for controlling the optical switch. The dispersion compensation amount is varied discontinuously by selecting a dispersion compensation fiber with the optical switch.

Among other methods for implementing a variable dispersion compensator are a method in which the dispersion value is varied by giving a temperature gradient to a fiber grating (Sergio Brarcelos et al., "Characteristics of Chirped Fiber Gratings for Dispersion Compensation," OFC '96 Technical Digest, WK12, pp. 161–162) and a method in which the dispersion value is varied by a temperature-variation-induced phase variation to a PLC (planar lightwave circuit) (K. Takiguchi et al., "Variable Group-delay Dispersion Equalizer Using Lattice-form Programmable Optical Filter on Planar Lightwave Circuit," IEEE J. Selected Topics in Quantum Electronics, 2, 1996, pp. 270–276).

(Functions and Advantages of the First Embodiment)

First, the basic concept will be described.

Figure 6:
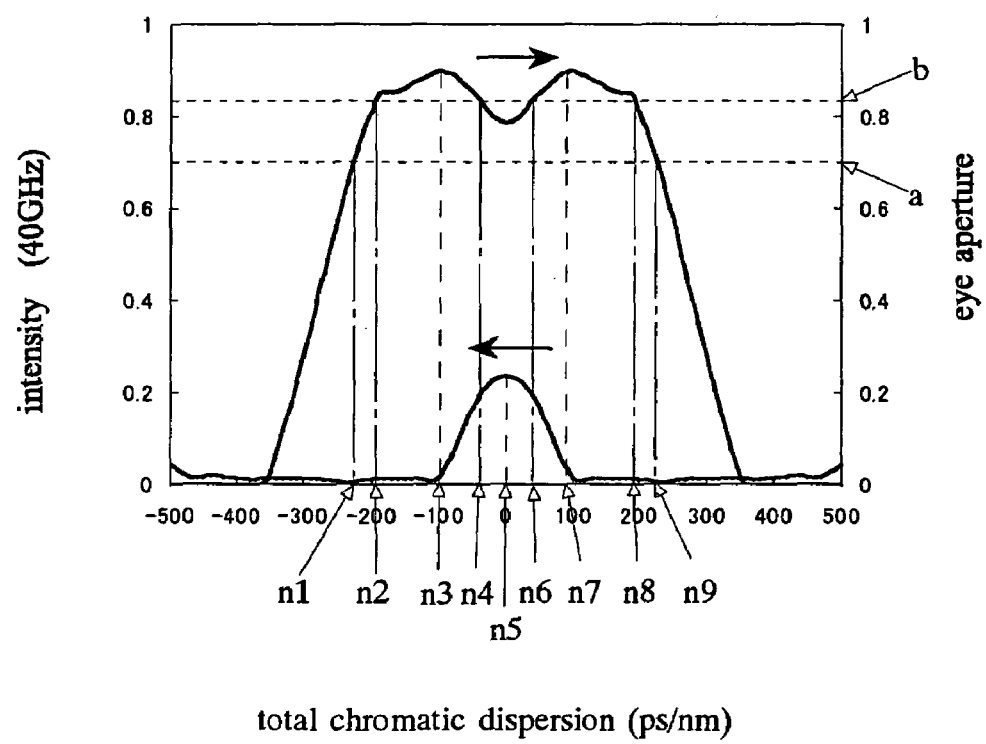
FIG. 6 is a graph showing a dispersion compensation method for a case where no nonlinear optical effect occurs in light transmission.

FIG. 6 illustrates a dispersion compensation method for a case where no nonlinear optical effect occurs in light transmission. In FIG. 6, the horizontal axis represents the total chromatic dispersion in ps/nm, the left vertical axis represents the intensity, and the right vertical axis represents the eye aperture. The intensity is absolute intensity and the eye aperture is a value that is normalized by the maximum vertical aperture of the eye of an eye pattern.

Figure 7:
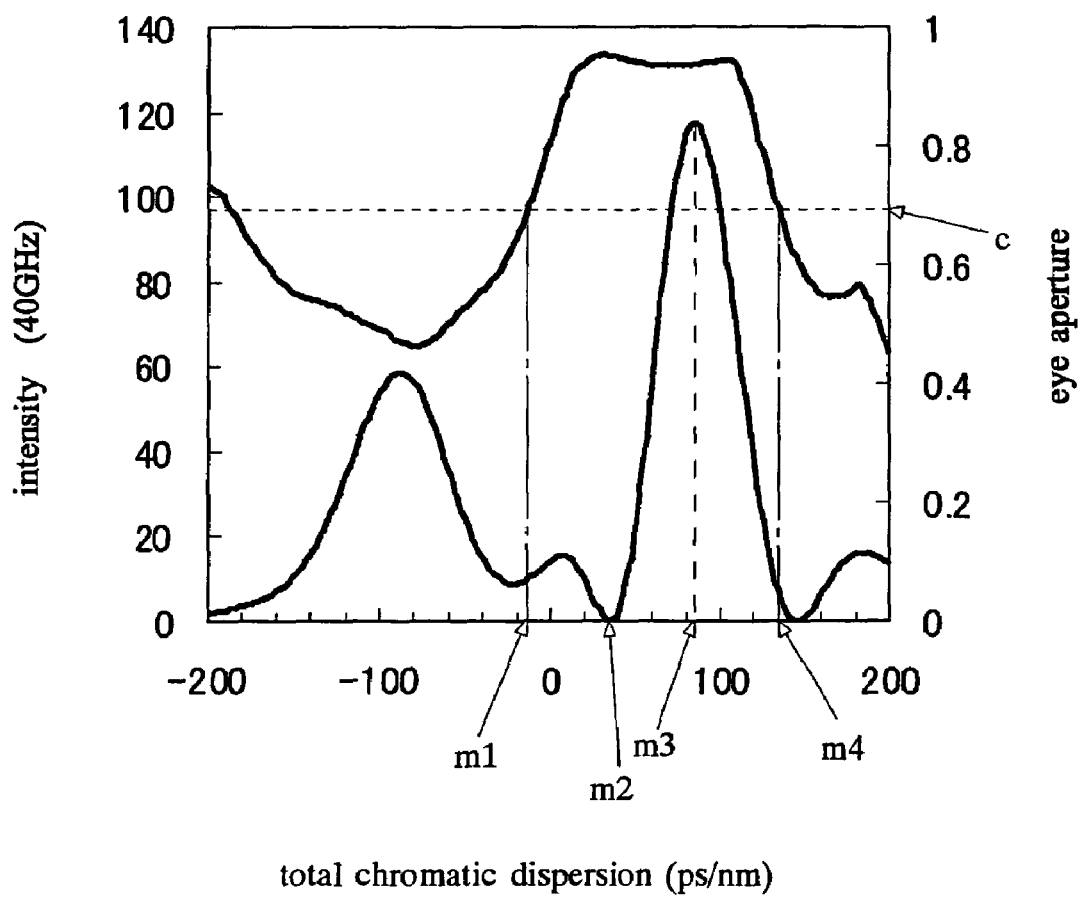
FIG. 7 is a graph showing a dispersion compensation method for a case where a nonlinear optical effect occurs in light transmission.

FIG. 6 includes two characteristic curves with respect to the total chromatic dispersion. The lower solid-line curve represents an intensity characteristic of a 40 GHz frequency component of an optical duo-binary signal. The upper solid-line curve represents an eye aperture characteristic. FIGS. 7–9 are drawn in the same manner as FIG. 6.

The curves in FIG. 6 show results of a simulation in which input light having an average optical power of 0 dBm is input to a single-mode optical fiber (SMF) and transmitted through it over 50 km.

As shown in FIG. 6, the eye aperture characteristic has a minimal value at a total chromatic dispersion value of 0 ps/nm and maximal values (also greatest values in the case of FIG. 6) on the left and right thereof. On the other hand, the intensity characteristic has a maximal value (also a greatest value in the case of FIG. 6) at a total chromatic dispersion value of 0 ps/nm. This results from the facts that the optical signal is of a duo-binary modulation type and the input optical power of the optical signal is not large enough to cause a nonlinear optical effect, and other factors.

Therefore, the relationship as shown in FIG. 6 holds between the eye aperture characteristic that relates to deterioration in receiver sensitivity and the intensity characteristic of the specific frequency component of an optical signal that are coupled with each other via the total chromatic dispersion.

If it is assumed that the reception condition is that the eye aperture should be higher than or equal to the level of point a that is lower than or equal to the minimal value, it is proper that the total chromatic dispersion N be in a range of $n1 \leq N \leq n9$. Therefore, if the chromatic dispersion is compensated for by a variable dispersion compensator so that the intensity of the specific frequency component is always equal to the greatest value, the total chromatic dispersion becomes 0 ps/nm. At this time, the eye aperture is higher than or equal to the level of point a and hence the reception condition is satisfied.

If it is assumed that the reception condition is that the eye aperture should be higher than or equal to the level of point b that is higher than the minimal value, it is proper that the total chromatic dispersion N be in ranges of $n2 \leq N \leq n4$ and $n6 \leq N \leq n8$. In this case, if the chromatic dispersion of a variable dispersion compensator is so adjusted that the intensity of the specific frequency component is kept equal to the greatest value, the eye aperture becomes lower than or equal to the level of point b. Therefore, to satisfy, as in the above case, the reception condition by adjusting the chromatic dispersion of a variable dispersion compensator so that the intensity of the specific frequency component is always equal to the greatest value, a total chromatic dispersion value where the intensity of the specific frequency component has a greatest value may be shifted by using a dispersion compensator having a fixed dispersion compensation value.

That is, the intensity of the specific frequency component is detected via a fixed dispersion compensator and the chromatic dispersion is compensated for by a variable dispersion compensator so that the detected intensity is always equal to the greatest value. With this measure, the eye aperture becomes higher than or equal to the level of point b and hence the reception condition is satisfied. The fixed chromatic dispersion value may be set in a range of n6-n8 (or n2-n4).

In particular, if a fixed dispersion compensator having a chromatic dispersion value where the eye aperture has the greatest value, that is, a chromatic dispersion value of point n7 (or n3), the eye aperture is made equal to the greatest value and hence the reception condition is satisfied in optimum form.

Next, a description will be made of a case where the optical power of input light is so large that an optical signal experiences a nonlinear optical effect in an optical transmission line.

FIG. 7 illustrates a dispersion compensation method for a case where a nonlinear optical effect occurs in light transmission.

Two curves in FIG. 7 are results of a simulation in which input light having an average optical power of +15 dBm is input to a single-mode optical fiber and transmitted through it over 50 km.

As shown in FIG. 7, the eye aperture characteristic has a greatest value when the total chromatic dispersion is about 30 ps/nm. As the total chromatic dispersion increases in a range of about 30–110 ps/nm, the eye aperture varies gently and is approximately kept at the greatest level. On the other hand, the intensity characteristic has a plurality of extreme values. This results from the facts that the optical signal is of a duo-binary modulation type and the input optical power of the optical signal is large enough to cause a nonlinear optical effect, and other factors.

Therefore, the relationship as shown in FIG. 7 holds between the eye aperture characteristic that relates to deterioration in receiver sensitivity and the intensity characteristic of the specific frequency component of an optical signal that are coupled with each other via the total chromatic dispersion.

If it is assumed that the reception condition is that the eye aperture should be higher than or equal to the level of point c, it is proper that the total chromatic dispersion N be in a range of m1≦N≦m4. On the other hand, in this range, the intensity of the specific frequency component has a minimal value at m2 and a maximal value (also a greatest value in the case of FIG. 7) at m3. Therefore, if the chromatic dispersion is compensated for by a variable dispersion compensator so that the intensity of the specific frequency component is always equal to the minimal value, the eye aperture is higher than or equal to the level of point c and hence the reception condition is satisfied. Alternatively, if the chromatic dispersion is compensated for by a variable dispersion compensator so that the intensity of the specific frequency component is always equal to the greatest value, the eye aperture is higher than or equal to the level of point c and hence the reception condition is satisfied.

As described above, for each of various optical power values of input light, an intensity characteristic of a specific frequency component and an eye aperture characteristic with respect to the total chromatic dispersion are determined in advance for a predetermined optical transmission line by measurements or simulations. Then, the chromatic dispersion is compensated for by a dispersion compensation method that is selected from the following methods (1)–(3) in accordance with the input optical power of an optical signal and a reception condition (eye aperture condition) in a target optical communication system:

(1) The intensity of a specific frequency component of an optical signal is detected and the total chromatic dispersion amount of the optical transmission line is adjusted by a variable dispersion compensator so that the detected intensity is always equal to a maximal value.

In specific, at input optical power that causes a nonlinear optical effect, a plurality of maximal values exist in the intensity characteristic. Therefore, a maximal value is selected in a total chromatic dispersion range in which the eye aperture satisfies the reception condition.

(2) The intensity of a specific frequency component of an optical signal is detected via a dispersion compensator having a fixed dispersion value, and the total chromatic dispersion amount of the optical transmission line is adjusted by a variable dispersion compensator so that the detected intensity is always equal to a maximal value.

In particular, from the viewpoint of obtaining best receiver sensitivity, it is preferable that the fixed dispersion value is set equal to the difference between a total chromatic dispersion amount where the intensity of the specific frequency component has a greatest value and a total chromatic dispersion amount where the eye aperture has a greatest value.

(3) The intensity of a specific frequency component of an optical signal is detected and the total chromatic dispersion amount of the optical transmission line is adjusted by a variable dispersion compensator so that the detected intensity is always equal to a minimal value.

In particular, at input optical power that causes a nonlinear optical effect, a plurality of minimal values exist in the intensity characteristic. Therefore, a minimal value is selected in a total chromatic dispersion range in which the eye aperture satisfies the reception condition.

The frequency of a specific frequency component is set equal to the bit rate of an optical signal. For example, where the bit rate of an optical duo-binary modulation signal is 40 Gb/s as in this embodiment, a 40 GHz frequency component of this optical duo-binary modulation signal is employed as a specific frequency component.

FIGS. 8A–8C and 9A–9C show results of simulations in which input light beams having average optical power values Pin of 0 dBm, +3 dBm, +6 dBm, +9 dBm, +12 dBm, and +15 dBm are input to a single-mode optical fiber and transmitted through it over 50 km. In this case, 0 dBm, +3 dBm, and +6 dBm are input optical power values that are not sufficient to cause a nonlinear optical effect and +9 dBm, +12 dBm, and +15 dBm are input optical power values large enough to cause a nonlinear optical effect.

In FIGS. 8A–8C and 9A–9C, marks "▼", "■", and "Δ", which exist in ranges where the eye aperture is sufficiently large, indicate a maximal value of the intensity of a 40 GHz frequency component, a minimal value of the intensity of a 40 GHz frequency component, and a greatest value of the eye aperture, respectively.

Next, the functions and the advantages of this embodiment will be described in more detail.

First, a description will be made of a case where the average input optical power of an optical signal is +3 dBm and the eye aperture is 0.7 and the dispersion compensation method (1) is employed.

First, in installing an optical communication system that is composed of the optical sending station 11, the optical transmission line 12, the optical receiving station 14, and, if necessary, the repeater stations 13, an installation party sets the average input optical power of an optical signal that is sent from the optical sending station 11 at +3 dBm.

The optical sending station 11 sends out an optical duo-binary signal. A test optical duo-binary signal may be sent out.

The optical signal thus sent is transmitted by the optical transmission line 12 and received by the optical receiving station 14. The intensity detecting part 22 of the optical receiving station 14 detects the intensity of a 40 GHz frequency component.

The CPU 128 varies the dispersion value of the VDC 121 from the smallest value to the greatest value at first constant intervals. For each constant interval, an output of the intensity detecting part 22 is stored in the memory 129 together with a dispersion value (voltage pattern) at that time. Outputs of the intensity detecting part 22 are represented by D0, D1, D2, D3, . . . , Dj.

The CPU 128 determines a greatest value from D0, D1, D2, D3, . . . , Dj that are stored in the memory 129. The greatest value is represented by Dmax0.

The CPU 128 searches the memory 129 for a dispersion value (voltage pattern) corresponding to the greatest value, and adjusts the DVC 121 so that it provides the dispersion value thus found. The CPU 128 stores the greatest value Dmax0 in the memory 129.

The CPU 128 again varies the dispersion value of the VDC 121 in the increasing direction at second constant intervals that are smaller than the first constant intervals and captures outputs of the intensity detecting part 22. The greatest value of those outputs is represented by Dmax1.

The CPU 128 compares Dmax0 and Dmax1.

If Dmax1 is greater than Dmax0, the CPU 128 makes Dmax1 a new Dmax0 and again varies the dispersion value of the VDC 121 in the increasing direction at the second constant intervals. The above operation is repeated until Dmax1 becomes smaller than Dmax0, whereby a greatest value can be detected precisely in a case where Dmax0 is located on an intensity characteristic curve having a positive slope. Even when the optical communication system is in service, the above operations may be performed to cope with variations with time.

On the other hand, if Dmax1 is smaller than Dmax0, the CPU 128 does not make Dmax1 a new Dmax0 and varies the dispersion value of the VDC 121 in the decreasing direction at the second constant intervals from the dispersion value (voltage pattern) corresponding to Dmax0. The CPU 128 captures outputs of the intensity detecting part 22. The greatest value of those outputs is represented by Dmax2.

The CPU 128 compares Dmax0 and Dmax2.

If Dmax2 is greater than Dmax0, the CPU 128 makes Dmax2 a new Dmax0 and again varies the dispersion value of the VDC 121 in the decreasing direction at the second constant intervals. By repeating the above operation until Dmax2 becomes smaller than Dmax0, a greatest value can be detected precisely in a case where Dmax0 is located at an intensity characteristic curve having a negative slope. Even when the optical communication system is in service, the above operations may be performed to cope with variations with time.

Using two kinds of intervals, that is, the first and second intervals, the CPU 128 can detect a greatest value quickly and precisely.

Although the above description is directed to the case where the input optical power of an optical signal is +3 dBm, chromatic dispersion can be compensated for in a similar manner for any input optical power such as 0 dBm, +6 dBm, +9 dBm, +12 dBm, or +15 dBm. Where there exist a plurality of maximal values as in the cases of +9 dBm, +12 dBm, or +15 dBm, data indicating where the target maximal value stands in the succession of maximal values in the variation range of total chromatic dispersion is stored in the memory 129 to allow the CPU 128 to extract the target maximal value by referring to the data. Alternatively, the dispersion variation range of the VDC 121 is limited so that the variation range of total chromatic dispersion is restricted so as to include only the target maximal value to allow the CPU 128 to extract the target maximal value. In this manner, the CPU 128 is enabled to extract only the target maximal value among a plurality of maximal values.

Next, a description will be made of a case where the average input optical power of an optical signal is +3 dBm and the eye aperture is 0.7 and the dispersion compensation method (2) is employed. Where the eye aperture is 0.85, for example, chromatic dispersion cannot be compensated for by the dispersion compensation method (1) and hence it is necessary to employ the dispersion compensation method (2).

First, a configuration of the optical receiving station 24 that is employed in this case will be described.

Figure 10:
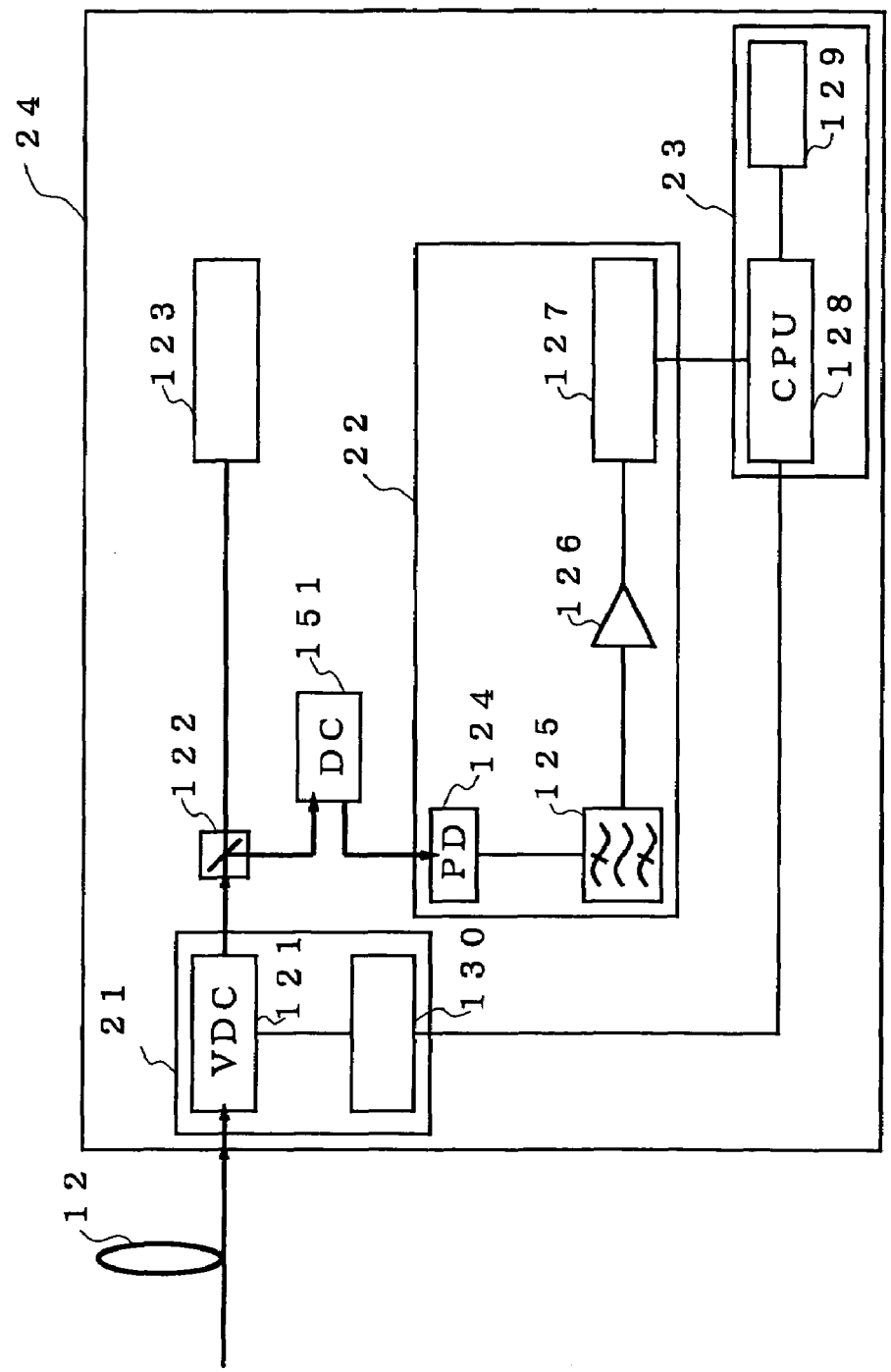
FIG. 10 shows the configuration of a modified optical receiving station that is used in the optical communication system according to the first embodiment.
Figure 11:
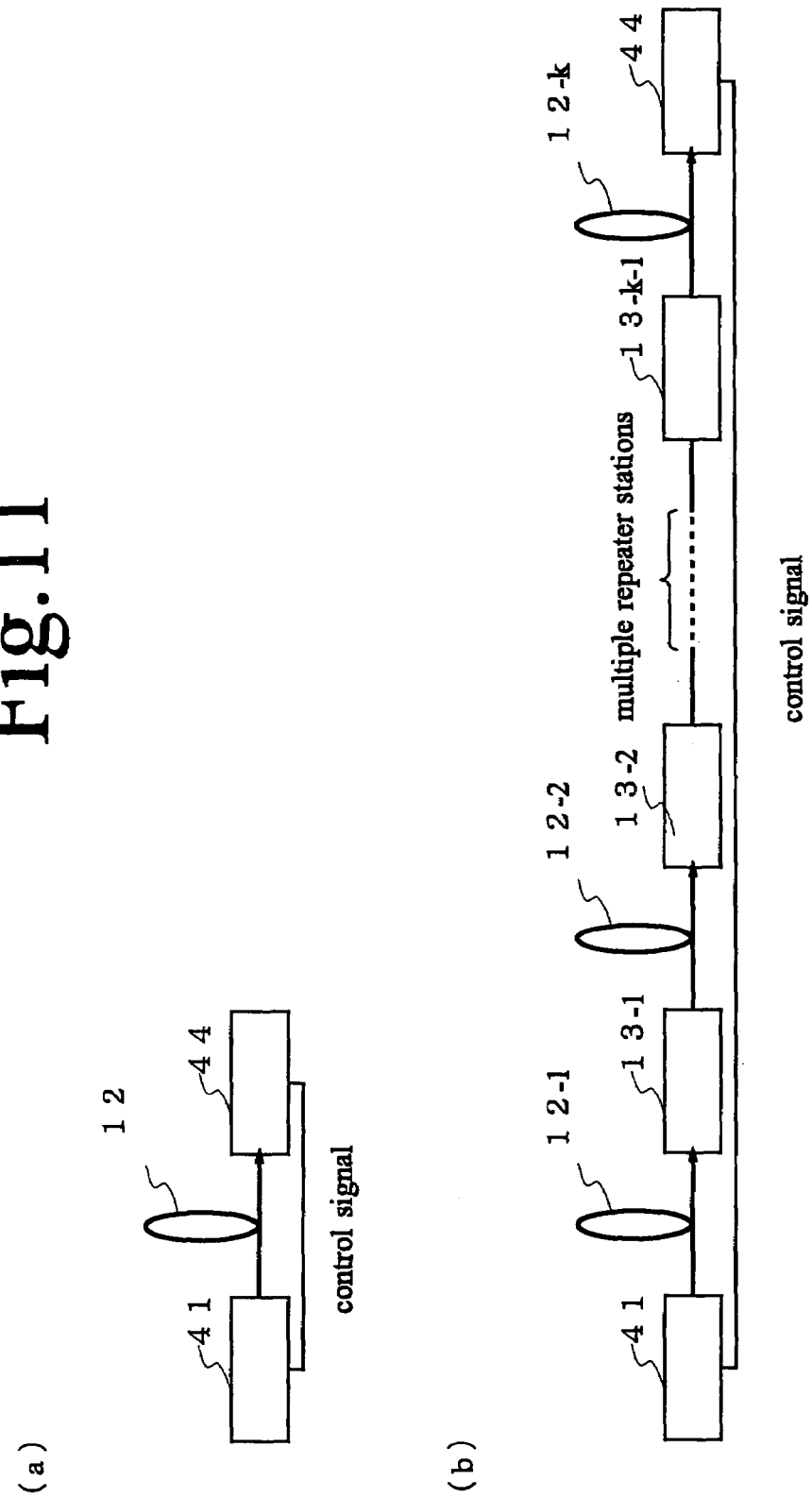
FIGS. 11A and 11B show the configurations of optical communication systems according to a second embodiment of the invention.

FIG. 10 shows the configuration of a modified optical receiving station that is used in the optical communication system according to the first embodiment.

The optical receiving station 24 is the same as the optical receiving station 14 shown in FIG. 3 except that a fixed dispersion compensator (hereinafter abbreviated as "DC") 151 is provided between the coupler 122 and the PD 124 as shown in FIG. 10, and hence its configuration will not be described.

Further, the optical communication system having the optical sending station 11, the optical transmission line 12, the optical receiving station 24, and, if necessary, the repeater stations 13 have the same functions and advantages as that of method (1) and hence its functions and advantages will not be described.

If the dispersion value of the DC 151 is set at about ±95 ps/nm in the case of FIG. 8A, about ±98 ps/nm in the case of FIG. 8B, and about +95 ps/nm and −97 ps/nm in the case of FIG. 8C, by always keeping the intensity at a greatest value the total chromatic dispersion can be optimized so that the eye aperture is equal to a greatest value.

Next, a description will be made of a case where the average input optical power of an optical signal is +12 dBm and the eye aperture is 0.8 and the dispersion compensation method (3) is employed. In this case, dispersion compensation is also possible with the dispersion compensation method (1).

First, in installing an optical communication system that is composed of the optical sending station 11, the optical transmission line 12, the optical receiving station 14, and, if necessary, the repeater stations 13, an installation party sets the average input optical power of an optical signal that is sent from the optical sending station 11 at +12 dBm.

The optical sending station 11 sends out an optical duobinary signal.

The optical signal thus sent is transmitted by the optical transmission line 12 and received by the optical receiving station 14. The intensity detecting part 22 of the optical receiving station 14 detects the intensity of a 40 GHz frequency component.

The CPU 128 varies the dispersion value of the VDC 121 from the smallest value to the greatest value at first constant intervals. For each constant interval, an output of the intensity detecting part 22 is stored in the memory 129 together with a dispersion value (voltage pattern) at that time. Outputs of the intensity detecting part 22 are represented by D0, D1, D2, D3, . . . , Dj.

The CPU 128 determines a smallest value from D0, D1, D2, D3, . . . , Dj that are stored in the memory 129. The smallest value is represented by Dmin0.

Where there exist a plurality of minimal values, data indicating where the target minimal value stands in the succession of minimal values in the variation range of total chromatic dispersion is stored in the memory 129 to allow the CPU 128 to extract the target maximal value by referring to the data. Alternatively, the CPU 128 first detects a greatest value and then extracts the target minimal value by using the greatest value as a reference. For example, in the case of FIG. 9B, the target minimal value is a minimal value that is found first when the total chromatic dispersion is decreased from the total chromatic dispersion value corresponding to the greatest value. As a further alternative, the dispersion variation range of the VDC 121 is limited so that the variation range of total chromatic dispersion is restricted so as to include only the target minimal value to allow the CPU 128 to extract the target maximal value. In this manner, the CPU 128 is enabled to extract only the target minimal value among a plurality of minimal values.

The CPU 128 searches the memory 129 for a dispersion value (voltage pattern) corresponding to the minimal value, and adjusts the DVC 121 so that it provides the dispersion value thus found. The CPU 128 stores the minimal value Dmin0 in the memory 129.

The CPU 128 again varies the dispersion value of the VDC 121 in the increasing direction at second constant intervals that are smaller than the first constant intervals and captures outputs of the intensity detecting part 22. The smallest value of those outputs is represented by Dmin1.

The CPU 128 compares Dmin0 and Dmin1.

If Dmin1 is smaller than Dmin0, the CPU 128 makes Dmin1 a new Dmin0 and again varies the dispersion value of the VDC 121 in the increasing direction at the second constant intervals. The above operation is repeated until Dmin1 becomes greater than Dmin0, whereby a minimal value can be detected precisely in a case where Dmin0 is located on an intensity characteristic curve having a negative slope. Even when the optical communication system is in service, the above operations may be performed to cope with variations with time.

On the other hand, if Dmin1 is greater than Dmin0, the CPU 128 does not make Dmin1 a new Dmin0 and varies the dispersion value of the VDC 121 in the decreasing direction at the second constant intervals from the dispersion value (voltage pattern) corresponding to Dmin0. The CPU 128 captures outputs of the intensity detecting part 22. The smallest value of those outputs is represented by Dmin2.

The CPU 128 compares Dmin0 and Dmin2.

If Dmin2 is smaller than Dmin0, the CPU 128 makes Dmin2 a new Dmin0 and again varies the dispersion value of the VDC 121 in the decreasing direction at the second constant intervals. By repeating the above operation until Dmin2 becomes greater than Dmin0, a minimal value can be detected precisely in a case where Dmin0 is located at an intensity characteristic curve having a positive slope. Even when the optical communication system is in service, the above operations may be performed to cope with variations with time.

Although the above description is directed to the case where the input optical power of an optical signal is +12 dBm, chromatic dispersion can be compensated for in a similar manner for input optical power that causes a non-linear optical effect such as +9 dBm or +15 dBm.

Second Embodiment (Configuration)

A second embodiment will be described below with reference to FIGS. 11A and 11B to FIG. 15. The second embodiment is directed to an optical sending station, an optical communication system, and a dispersion controlling method according to the invention. Whereas in the first embodiment the total chromatic dispersion is optimized by changing the chromatic dispersion value of the VDC 121, in the second embodiment the total chromatic dispersion is optimized by changing the wavelength of the optical carrier wave of an optical duo-binary signal.

As shown in FIG. 11A, an optical communication system according to the second embodiment is composed of an optical sending station 41, an optical transmission line 12, and an optical receiving station 44.

An optical duo-binary signal generated by the optical sending station 41 is sent to the optical transmission line 12 and then subjected to reception processing in the optical receiving station 44. A line through which to transmit a control signal (described later) from the optical receiving station 44 to the optical sending station 41 is provided.

Where the transmission distance between the optical sending station 41 and the optical receiving station 44 is long, a necessary number of repeater stations 13 are provided in the optical transmission line 12 as shown in FIG. 11B. Having an optical amplifier etc., each repeater station 13 amplifies an optical duo-binary signal.

Figure 12:
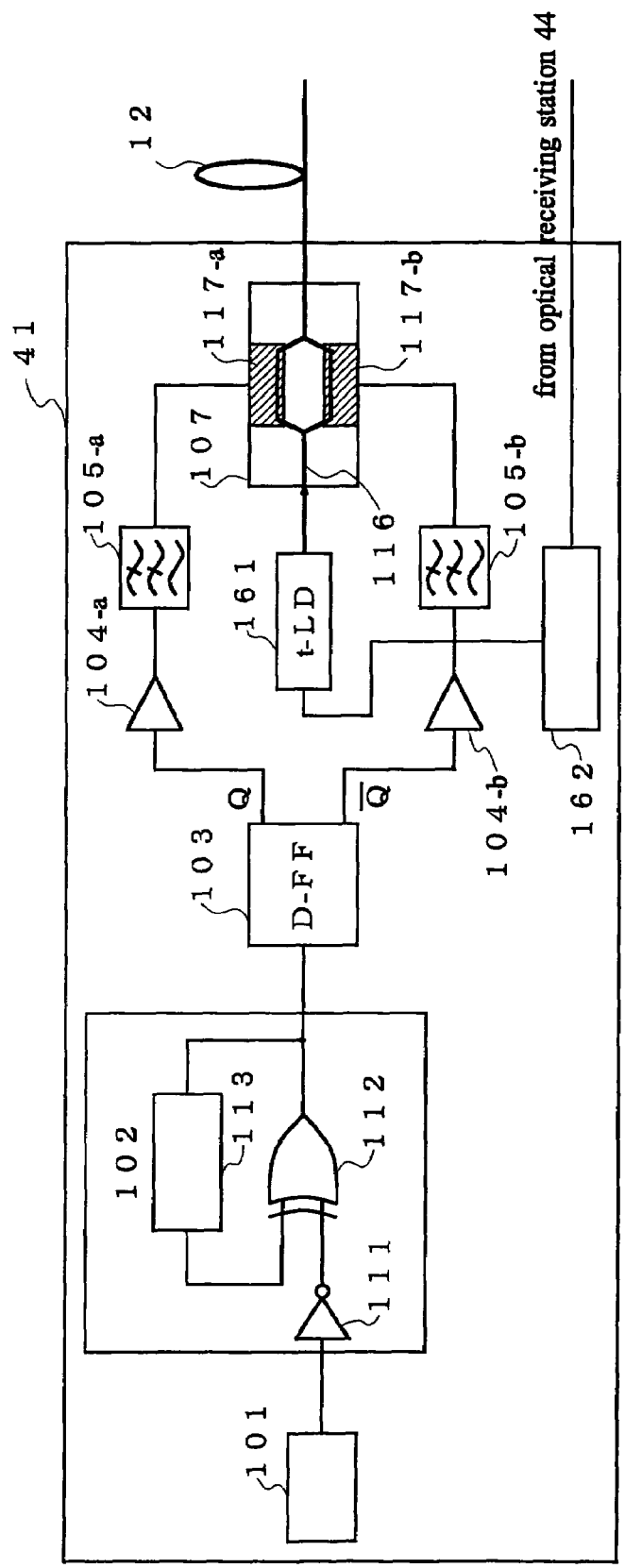
FIG. 12 shows the configuration of an optical sending station of the optical communication system according to the second embodiment.

The optical sending station 41 of the second embodiment is the same as the optical sending station 11 of the first embodiment shown in FIG. 2 except that as shown in FIG. 12 a wavelength-tunable laser (hereinafter abbreviated as "t-LD") 161 is used in place of the LD 106 and an LD controlling circuit 162 is newly provided. Therefore, the configuration of the optical sending station 41 will not be described except for the different components.

The t-LD 161 is a semiconductor laser capable of changing the oscillation wavelength such as a distributed Bragg reflector (DBR) wavelength-tunable laser, a distributed feedback (DFB) wavelength-tunable laser, a wavelength selection feedback wavelength-tunable laser using an external diffraction grating, or a composite resonator wavelength-tunable laser using an external reflector.

The LD controlling circuit 162 receives a control signal to be used for controlling the t-LD 161 so that it oscillates at a predetermined wavelength that is transmitted from a CPU 168 of the optical receiving station 44 via the above-mentioned line. The LD controlling circuit 162 controls the t-LD 161 so that it oscillates at the wavelength that is indicated by the received control signal. For example, in the case of a DBR wavelength-tunable laser or a DFB wavelength-tunable laser, the oscillation wavelength can be controlled by changing the device temperature of the t-LD 161 with a Peltier device or the like or by changing the injection current of the t-LD 161 or by using both methods.

In the optical sending station 41, laser light having a predetermined wavelength is emitted by the t-LD 161. As described in the first embodiment, the laser light is input to the MZ modulator 107, where it is modulated in light intensity according to a duo-binary signal that is applied to the electrodes 117. Modulated laser light is output to the optical transmission line 12 as an optical duo-binary signal.

Figure 3:
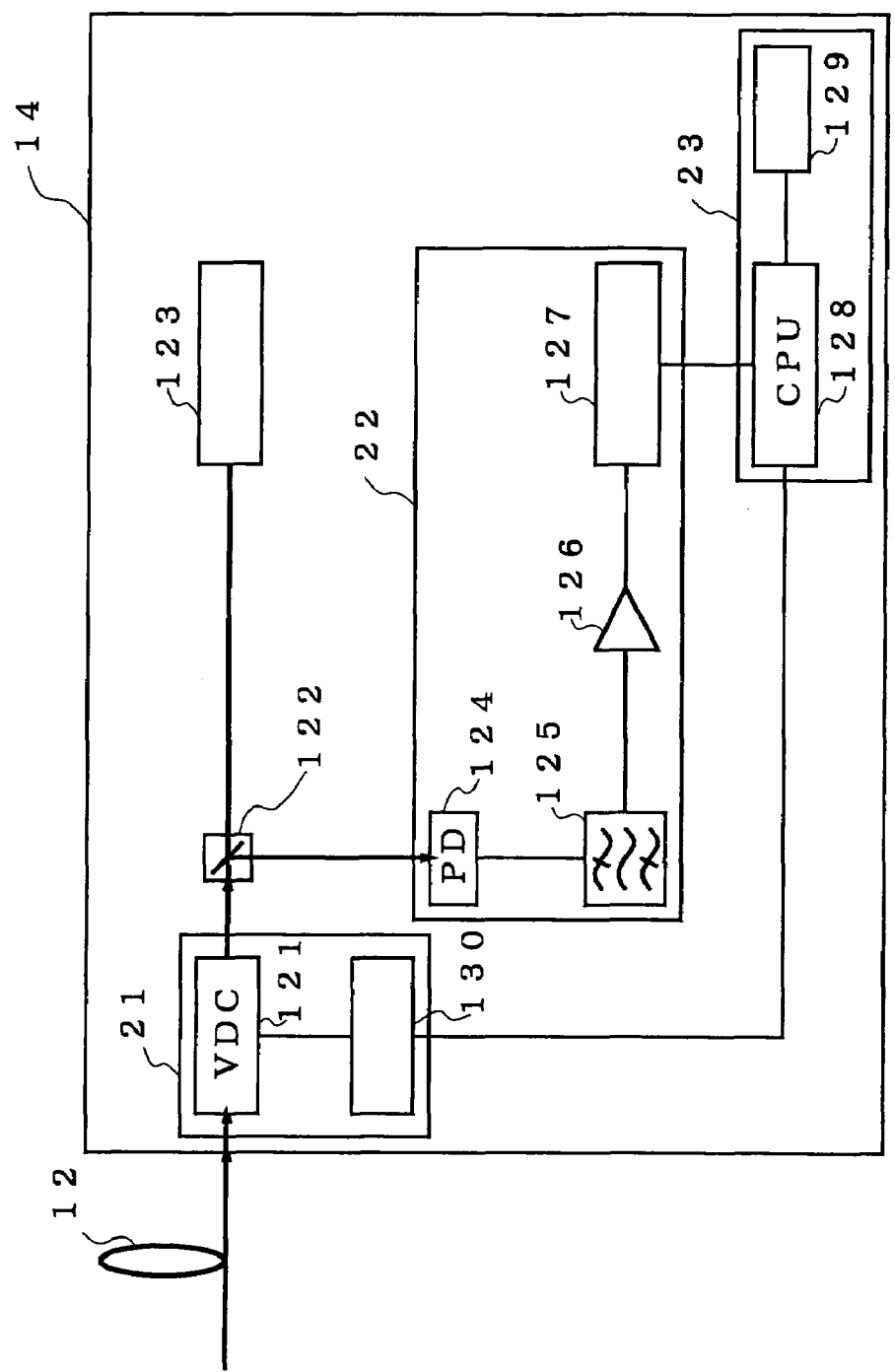
FIG. 3 shows the configuration of an optical receiving station of the optical communication system according to the first embodiment.
Figure 13:
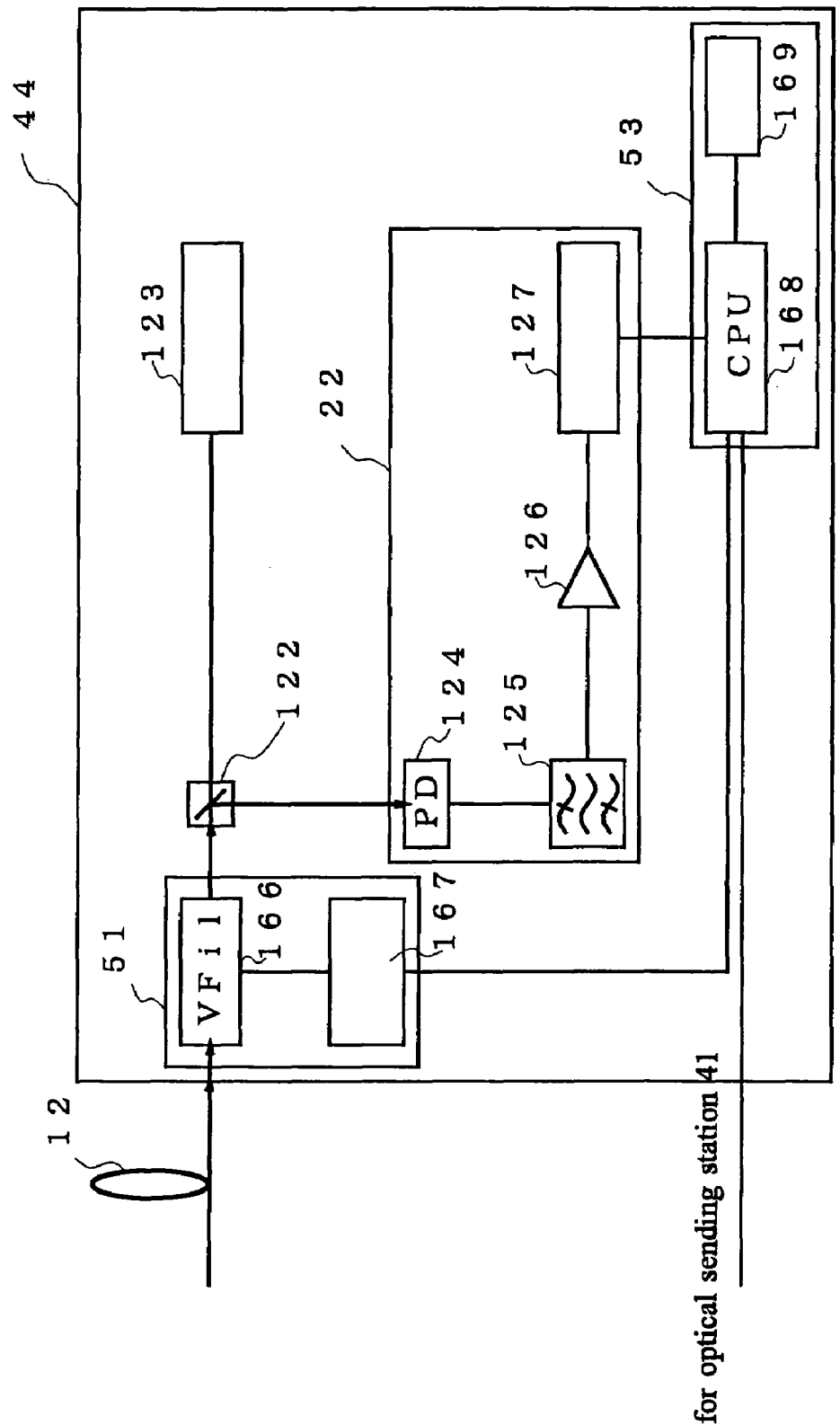
FIG. 13 shows the configuration of an optical receiving station of the optical communication system according to the second embodiment.

On the other hand, the optical receiving station 44 of the second embodiment is the same as the optical receiving station 14 of the first embodiment shown in FIG. 3 except that as shown in FIG. 13 a filter part 51 and a controlling part 53 are provided in place of the dispersion compensating part 21 and the controlling part 23, respectively. Therefore, the configuration of the optical receiving station 44 will not be described except for the different components.

An optical duo-binary signal transmitted by the optical transmission line 12 is input to a variable filter (hereinafter abbreviated as "VFil") of the filter part 51.

The VFil 166 is a band-pass filter and can change its passing wavelength range. The passing wavelength range is controlled by the CPU 168 so as to pass the wavelength of the optical duo-binary signal.

An optical signal that is output from the VFil 166 is supplied to the optical receiving part 123 and the intensity detecting part 22 via the coupler 122. An output of the intensity detecting part 22 is input to the CPU 168 of the controlling section 53. The controlling part 53 has the CPU 168 and a memory 169.

A table showing a relationship between passing wavelength ranges of the VFil 166 and control signals, programs for operation of the CPU 168, etc. are stored in advance in the memory 169. Various values etc. that occur during execution of a program are stored in the memory 169 on each occasion. The memory 169 returns a result in response to a request from the CPU 168.

Being a microprocessor or the like, the CPU 168 outputs a control signal to be used for controlling the passing wavelength range of the VFil 166 to a VFil controlling circuit 167 of the filter part 51 (details of control will be described below) and also outputs a signal to be used for controlling the oscillation wavelength of the t-LD 161 of the optical sending station 41 to the LD controlling circuit 162.

The filter part 51 is composed of the VFil 166 and the VFil controlling circuit 167 for driving the VFil 166. The VFil controlling circuit 167 changes the passing wavelength range of the VFil 166 according to a signal that is supplied from the CPU 168.

As described above, the optical receiving part 44 is composed of the filter part 51, the coupler 122 for branching input light into two parts, the optical receiving part 123, the intensity detecting part 22, and the controlling part 53.

The filter part 51 can receive an optical duo-binary signal and can change its own passing wavelength range. The intensity detecting part 22 detects the intensity of a specific frequency component of an optical duo-binary signal. The controlling part 53 adjusts the wavelength of an optical signal so that the output of the intensity detecting part 22 has a predetermined extreme value, and adjusts the passing wavelength range of the filter part 51 to pass the thus-adjusted wavelength.

In the second embodiment, a control signal to be used for adjusting the oscillation wavelength of the t-LD 161 is transmitted from the optical receiving station 44 to the optical sending station 41 via the dedicated physical line. However, the invention is not limited to such a case. For example, in the case of an optical wavelength division multiplexing signal, an optical signal having one of its wavelengths may be used. Alternatively, undefined bytes of a section overhead of SDH (synchronous digital hierarchy) may be used. The section overhead is a portion for accommodating information that is necessary for operation of a network, such as maintenance information and a status monitor.

(Functions and Advantages of the Second Embodiment)

In the optical communication system according to the second embodiment, the same effects as obtained in the first embodiment by changing the dispersion value of the VDC 121 are obtained by changing the wavelength of an optical signal. Therefore, the functions and advantages of the second embodiment can be described in the same manner as those of the first embodiment and hence will not be described.

FIGS. 14A and 14B show exemplary relationships between the intensity vs. wavelength characteristic and the eye aperture vs. wavelength characteristic. FIG. 14A is obtained by converting the total chromatic dispersion into the wavelength in FIG. 8A (input optical power Pin=0 dBm). FIG. 14B is obtained by converting the total chromatic dispersion into the wavelength in FIG. 9A (input optical power Pin=+9 dBm). Figures corresponding to FIGS. 8B, 8C, 9B, and 9C can also be obtained by the same manner of conversion.

As seen from FIGS. 14A and 14B, distribution compensation methods similar to the above-described dispersion compensation methods (1)–(3) can be used in the second embodiment. Therefore, the total chromatic dispersion of the optical communication system can also be optimized by the second embodiment.

A description will be made of the configuration of an optical receiving station 64 in which the intensity of a specific frequency component is detected via a fixed dispersion compensator.

Figure 15:
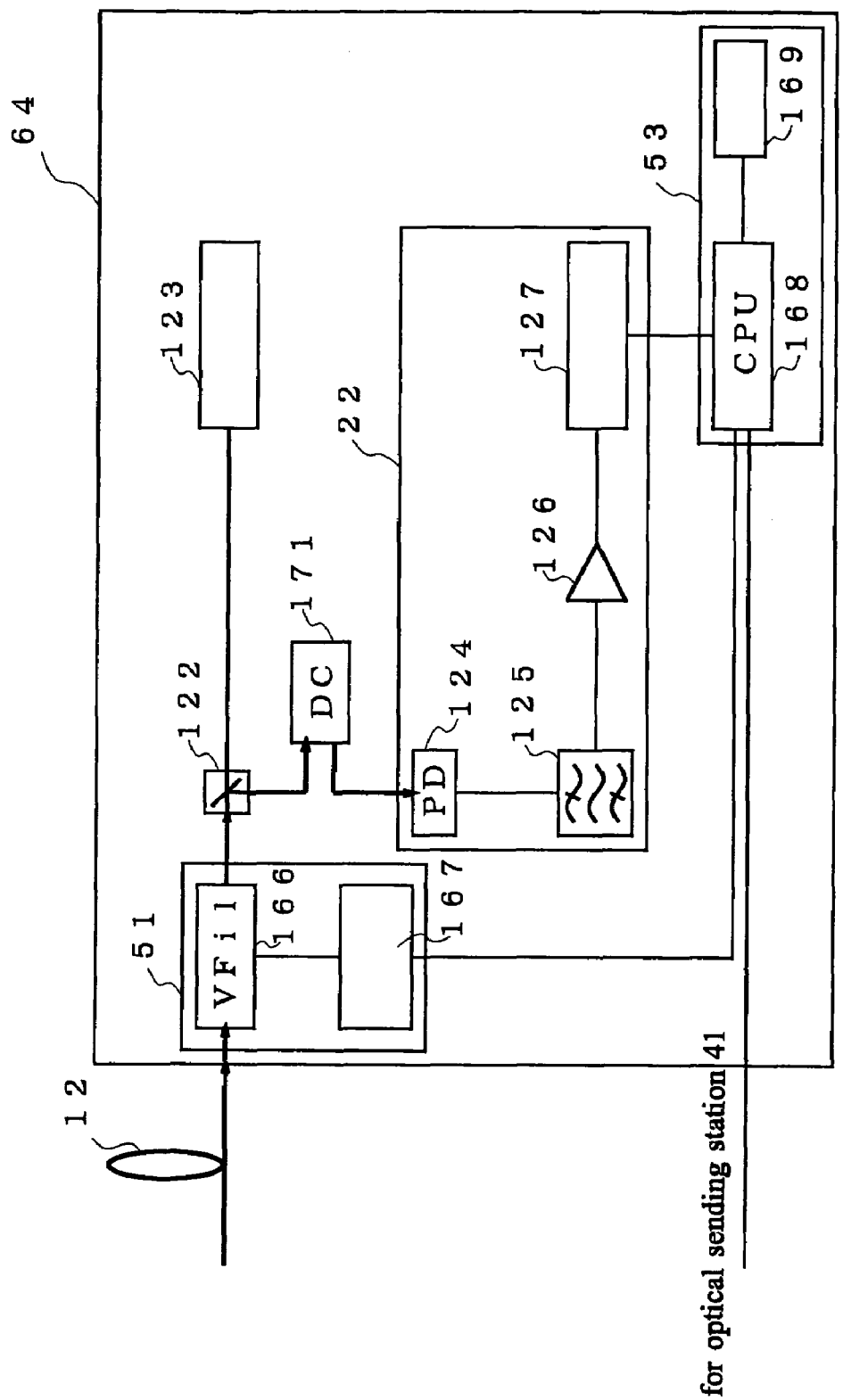
FIG. 15 shows the configuration of a modified optical receiving station that is used in the optical communication system according to the second embodiment.

FIG. 15 shows the configuration of a modified optical receiving station that is used in the optical communication system according to the second embodiment.

The optical receiving station 64 is the same as the optical receiving station 44 shown in FIG. 13 except that a DC 171 is provided between the coupler 122 and the PD 124 as shown in FIG. 15, and hence its configuration will not be described. By using the optical receiving station 64 in place of the optical receiving station 44 shown in FIG. 11, a dispersion compensation method similar to the above-described dispersion compensation method (2) can be realized by changing the wavelength of an optical signal can be realized.

Although the first and second embodiments are directed to the optical communication systems that deal with a single-wavelength optical duo-binary signal, the invention can also be applied to a wavelength division multiplexing optical communication system. That is, the invention may be practiced for each wavelength component after a wavelength division multiplexing optical signal is separated into different wavelength components.

Although the first and second embodiments are directed to the case where the specific frequency component has the frequency of 40 GHz, the invention can also be applied to cases of other frequency components because the specific relationship holds between the intensity characteristic and the eye aperture characteristic.

The invention is not limited to the above embodiments and various modifications are possible without departing from the spirit and scope of the invention. Any improvements may be made in part or all of the components.

What is claimed is:

1. An optical receiving station comprising:
   a filter compensating chromatic dispersion of an optical duo-binary signal received from an optical transmission line with a passing wavelength range;
   an intensity detector detecting intensity of a specific frequency component of said optical duo-binary signal output from said filter, the intensity being at its greatest value when a total chromatic dispersion value of the optical duo-binary signal output from said filter is at zero; and
   a wavelength controller adjusting a wavelength of said optical duo-binary signal so that the intensity detected by said intensity detector has the greatest value, and adjusting the passing wavelength range of said filter to pass the adjusted wavelength under a condition of intensity in which the optical duo-binary signal can be received at an optical transmission line without causing a non-linear optical effect and under a condition of receiving wavelength of the total chromatic dispersion in which an eye aperture condition can be equal to or more than a predetermined value.

2. An optical receiving station comprising:
   a filter compensating chromatic dispersion of an optical duo-binary signal received from an optical transmission line with a passing wavelength range;
   an intensity detector detecting intensity of a specific frequency component of said optical duo-binary signal output from said filter; and
   a wavelength controller adjusting a wavelength of said optical duo-binary signal so that the intensity detected by said intensity detector has a predetermined extreme value, and adjusting the passing wavelength range of said filter to pass the adjusted wavelength, wherein
   the filter comprises a fixed dispersion compensator compensating chromatic dispersion of the optical duo-binary signal with a fixed dispersion value, to thereby output a fixed dispersion compensated optical duo-binary signal from the fixed dispersion compensator, and
   the fixed dispersion compensated optical duo-binary signal output from the fixed dispersion compensator is input to said intensity detector.

3. An optical receiving station comprising:
a filter compensating chromatic dispersion of an optical duo-binary signal received from an optical transmission line;
a dispersion compensator having a fixed dispersion compensation value that adjusts said optical duo-binary signal output from said filter;
an intensity detector detecting intensity of a specific frequency component whose intensity becomes a greatest value when a total chromatic dispersion value is at zero, the specific frequency component being output from said dispersion compensator; and
a wavelength controller adjusting wavelength of said optical duo-binary signal so that the intensity detected by said intensity detector is at its greatest value, under a condition of intensity in which the optical duo-binary signal can be received at an optical transmission line with a non-linear optical effect and under a condition of receiving wavelength of the total chromatic dispersion in which an eye aperture condition can be equal to or more than a predetermined value, and adjusting a passing wavelength range of said filter to pass the adjusted wavelength.

4. An optical transmission system comprising:
an optical sending station generating an optical duo-binary signal;
an optical transmission line transmitting said generated optical duo-binary signal; and
an optical receiving station including
a filter compensating chromatic dispersion of the optical duo-binary signal received from the optical transmission line with a passing wavelength range,
an intensity detector detecting intensity of a specific frequency component of said optical duo-binary signal output from said filter, the intensity being at its greatest value when a total chromatic dispersion value of the optical duo-binary signal output from said filter is at zero, and
a wavelength controller adjusting a wavelength of said optical duo-binary signal so that the intensity detected by said intensity detector has a greatest value, and adjusting the passing wavelength range of said filter to pass the adjusted wavelength under a condition of intensity in which the optical duo-binary signal can be received at the optical transmission line without causing a non-linear optical effect and under a condition of receiving wavelength of the total chromatic dispersion in which an eye aperture condition can be equal to or more than a predetermined value.

5. An optical transmission system comprising:
an optical sending station generating an optical duo-binary signal;
an optical transmission line transmitting said generated optical duo-binary signal; and
an optical receiving station including
a filter compensating chromatic dispersion of the optical duo-binary signal received from the optical transmission line with a passing wavelength range;
an intensity detector detecting intensity of a specific frequency component of said optical duo-binary signal output from said filter; and
a wavelength controller adjusting a wavelength of said optical duo-binary signal so that the intensity detected by said intensity detector has a predetermined extreme value, and adjusting the passing wavelength range of said filter to pass the adjusted wavelength, wherein
the filter comprises a fixed dispersion compensator compensating chromatic dispersion of the optical duo-binary signal with a fixed dispersion value, to thereby output a fixed dispersion compensated optical duo-binary signal from the fixed dispersion compensator, and
the fixed dispersion compensated optical duo-binary signal output from the fixed dispersion compensator is input to said intensity detector.

6. An optical receiving station comprising:
a chromatic dispersion compensator selected from a group consisting of (1) or (2) as follows:
(1) a filter compensating chromatic dispersion of an optical duo-binary signal received from an optical transmission line with a passing wavelength range,
an intensity detector detecting intensity of a specific frequency component of said optical duo-binary signal output from said filter, the intensity being at its greatest value when a total chromatic dispersion value of the optical duo-binary signal from said filter is at zero, and
a wavelength controller adjusting a wavelength of said optical duo-binary signal so that the intensity detected by said intensity detector has the greatest value, and adjusting the passing wavelength range of said filter to pass the adjusted wavelength under a condition of intensity in which the optical duo-binary signal can be received at an optical transmission line without causing a non-linear optical effect and under a condition of receiving wavelength of the total chromatic dispersion in which an eye aperture condition can be equal to or more than a predetermined value; and
(2) a filter compensating chromatic dispersion of an optical duo-binary signal received from an optical transmission line with a passing wavelength range,
an intensity detector detecting intensity of a specific frequency component of said optical duo-binary signal output from said filter, the intensity being at an extreme value, and
a wavelength controller adjusting a wavelength of said optical duo-binary signal so that the intensity detected by said intensity detector has the extreme value, and adjusting the passing wavelength range of said filter to pass the adjusted wavelength under a condition of intensity in which the optical duo-binary signal can be received at an optical transmission line without causing a non-linear optical effect and under a condition of receiving wavelength of the total chromatic dispersion in which an eye aperture condition can be equal to or more than a predetermined value,
wherein the selecting is done according to an input optical power of an optical signal or a reception condition of the optical signal in a target optical transmission system.

* * * * *